Patented May 22, 1951

2,554,214

UNITED STATES PATENT OFFICE 2,554,214

DRILLING FLUIDS AND METHODS OF USE

Virgil Scarth, Bartlesville, Okla., assignor to Phillips Petroleum Company, a corporation of Delaware No Drawing. Application August 18, 1947,
Serial No. 769,311

22 Claims. (Cl. 252—8.5)

This invention relates to water base drilling muds containing a salt of carboxymethylcellulose and a metal selected from the group composed of the metals of groups IB, IIB, IV, V, VI, VII and VIII of the periodic series of elements as shown on page 118 of "Modern Inorganic Chemistry" by J. W. Mellor, revised and edited by G. D. Parkes and published by Longmans, Green & Company (1939), which are hereinafter called heavy metal salts of carboxymethylcellulose. In some aspects it relates to drilling fluids suitable for drilling in heaving shale. In still other aspects it relates to drilling fluids having a high salt content, due either to deliberate addition of salt, or due to contamination of the mud with salt from natural formations or from connate waters. It also relates to methods of drilling or controlling wells with such fluids.

In the art of drilling wells, especially drilling by the rotary method, it is necessary to use a drilling mud, as is well understood in the art. The drilling mud lubricates the drill stem, carries the cuttings to the surface of the well, and forms a filter cake on the walls of the well preventing loss of at least any substantial amount of water from the drilling mud to the natural formations in the well. In order to perform these important functions properly the drilling mud must have suitable viscosity and other qualities at all times in spite of adverse conditions encountered in drilling the well.

In drilling wells there are two major difficulties caused by natural formations penetrated. The first of these difficulties is that if salt is encountered the salt will cut ordinary drilling mud so that its viscosity is entirely too high, the clay particles are flocculated, and there is grave danger of the drilling pipe twisting in half or of gas cutting of the mud, or a blowout occurring due to the salt cutting of the mud. The other difficulty encountered is that when a formation known as heaving shale is penetrated, this heaving shale absorbs water from the drilling mud and by a caving or disintegration action common to clay and shale, or by a swelling action common to bentonite materials, the well hole is closed around the drill string choking off the circulation of drilling mud and often seizing the drill string so that the drill string twists in half.

The principal object of my invention is to produce a drilling mud which can be used not only in ordinary formations but which will resist contamination by salt and which will not cause heaving shale or similar formations to cave or swell.

Another object is to provide an improved drilling mud.

Another object is to provide an improved method of drilling.

A further object is to provide a drilling mud containing a heavy metal carboxymethylcellulose.

Another object is to provide a drilling mud containing a heavy metal carboxymethylcellulose and a salt.

Another object is to provide a method of drilling suitable in ordinary formations, in salt containing formations and in formations tending to cave or heave.

Numerous other objects and advantages of the invention will be apparent to those skilled in the art upon reading the following specification and the accompanying claims.

OPERATION

In the present invention I prefer to employ as a colloidal suspending agent or dispersing agent in a drilling mud a heavy metal carboxymethylcellulose. The amount of such heavy metal carboxymethylcellulose employed can be varied considerably as even small amounts give a corresponding smaller effect. I prefer to use heavy metal carboxymethylcellulose in the ratio of about two pounds per 42 gallon barrel of mud. Below 0.25 lbs./bbl., the treating effect would be too small and above four lbs./bbl., the ten minute gel strength would be too high for proper circulation with well pumps. I prefer to use from 0.5 to three lbs./bbl. The amount used depends on the nature of the earth formations encountered in the drilling. Because of the differences in natural formations encountered, I prefer to give functional rather than numerical limits. However, much less or much more of the heavy metal carboxymethylcellulose may be employed and still the advantages of my invention will be achieved to a greater or lesser extent.

The heavy metal carboxymethylcellulose may be in dried powder form, the particle size not being critical. However for rapid solution and for suspension a particle size where 95% will pass an 80 mesh screen is useful. In the case of some slowly soluble heavy metal carboxymethylcelluloses, or to speed up the solution or suspension of any heavy metal carboxymethylcellulose, any suitable wetting agent, such as alcohols may be added first. These salts are most effective in muds having a pH of 9.0–12.0.

In rotary drilling the methods consist in adding the heavy metal carboxymethylcellulose powder, which may be added to the drilling fluid flowing in the mud ditch to the pump intake; or to the mud pit; by scattering the powder over the surface. An alternative method would be to make up a more or less concentrated solution or suspension of the desired heavy metal carboxymethylcellulose and add that in a stream to the drilling mud. In some instances a pure mixture of water and heavy metal carboxymethylcellulose may be used as the well drilling or well controlling fluid, but mud is generally added. The drilling fluid containing the heavy metal carboxymethylcellulose and water is pumped in circulation or reverse circulation in the drill string or used to fill or partially fill the well in the usual operations of well drilling and well controlling of the prior art. When the heavy metal carboxymethylcellulose is so used in sufficient amount a new result is achieved in that salt water does not cut the mud qualities enough to harm it for drilling and formations exposed to it do not cave or heave enough to stop the drilling. Suitable control by mud treating agents may be used, such as phosphates and/or quebracho if desired.

Heavy metal carboxymethylcelluloses, such as iron carboxymethylcellulose, lead carboxymethylcellulose and zinc carboxymethylcellulose give excellent results in water base drilling mud as stated herein, the various heavy metal carboxymethylcelluloses having quite similar effects on the water base mud.

The degree of substitution of carboxymethyl groups in the cellulose of the carboxymethylcelluloses employed in making my heavy metal carboxymethylcelluloses is such that the sodium salt of the same is water soluble.

Any use of a heavy metal carboxymethylcellulose to be retained as a soluble or suspended dispersing agent throughout the entire normal life of the drilling mud is not to be confused with the use of some alkali or acid soluble cellulose which is to be precipitated as an insoluble plugging agent in the formation. I do not use my heavy metal carboxymethylcellulose as a plugging agent at all, and while calcium ions present in a connate water in a subterranean formation may form a colloidal haze of supposedly insoluble calcium carboxymethylcellulose salts and while this colloidal calcium carboxymethylcellulose may contact the formation, such colloidal material is not comparable to the immediate precipitation of relatively massive insoluble plugging material formed by alkali or acid soluble celluloses upon removal or dilution of the alkali or acid. The haze of calcium carboxymethylcellulose formed from heavy metal carboxymethylcelluloses is colloidal and does not precipitate under ordinary conditions.

The mode or theory of operation by which the heavy metal carboxymethylcelluloses protect the surface of clay or bentonite from attack by water is obscure, but it is believed that as the water attempts to enter the clay the heavy metal carboxymethylcellulose forms a layer of a protective material on the outside of the clay or bentonite, preventing the clay or bentonite from absorbing the water from the drilling mud.

Heavy metal carboxymethylcellulose containing drilling muds often have low initial gel strength which allows gas bubbles to come out of the drilling mud so rapidly that the danger of the drilling mud becoming gas cut is greatly reduced. Reduction of gas cutting reduces the chances of blowouts. Heavy metal carboxymethylcellulose drilling muds are often characterized by very thin filter cake thickness and by very small water loss. This is very useful in avoiding loss of water to the formation, as well as the resultant swelling or caving of the formation which occurs with some formations. They do not generally ferment or spoil. Numerous other advantages of heavy metal carboxymethylcellulose drilling muds will be apparent from a study of the following representative experiments which have been selected to show in a minimum of space the advantages of heavy metal carboxymethylcellulose drilling muds.

TESTS

The tests of the properties of solutions of heavy metal carboxymethylcelluloses and/or drilling muds were all made with standard drilling mud laboratory equipment.

The measurements of pH were all made with a Beckman "Industrial Model G" pH meter. The viscosity measurements were all made with a Stormer viscosimeter 1931 model made by Arthur H. Thomas Company. The mixing of samples was always for 15 minutes with a Hamilton Beach No. 33 high speed mixer. Sodium chloride content was calculated from a determination of the chlorine ions by titration with silver nitrate using a potassium chromate indicator. The filter cake thickness and water losses were all determined with an "A. P. I. low pressure wall building tester filter press" with a pressure of 100 lbs. per square inch applied for 30 minutes. All temperatures were approximately room temperature. All barrels are 42 U. S. gallon barrels.

EXAMPLE A

The heavy metal salts were prepared by adding a concentrated solution of a soluble salt of each metal to a 25 ml. portion of a 2 wt. percent sodium carboxymethylcellulose solution. Some of the heavy metal carboxymethylcelluloses were found to be soluble in the resulting solutions and some were precipitated out. The results were as follows:

| Metal Salt Added | Results |
| --- | --- |
| $Zn(NO_3)_2$ | No precipitate. |
| $Co(NO_3)_2$ | Do. |
| $MnCl_2$ | Do. |
| $Ni(NO_3)_2$ | Do. |
| $NiSO_4$ | Do. |
| $AgNO_3$ | White ppt., turned black on standing. |
| $Cd(NO_3)_2$ | White, voluminous ppt. |
| $Cu(NO_3)_2$ | Blue, voluminous ppt. |
| $Fe(NO_3)_3$ | Red, voluminous ppt. |
| $Pb(NO_3)_2$ | White, voluminous ppt. |
| $SnCl_2$ | Do.[1] |
| $Hg(NO_3)_2$ | Do. |

[1] A large amount of stannous chloride was required to produce a precipitate.

EXAMPLE B

The mercury, lead and iron salts were selected for tests in combination with a mud. The supernatant liquid was decanted from each and tested for completeness of precipitation by the addition of a few drops of $Fe(NO_3)_3$. Precipitation was found to be complete in each case.

The precipitates of mercury, lead and iron salts were made up to 50 ml. and added to 250 ml. of separate portions of a laboratory prepared drilling mud designated as EB-10-F, which had the following composition after dilution: Ezmix (a native Texas clay) 8.10%, bentonite 0.80%, $BaSO_4$ 26.30%, $BaCO_3$ 0.80% and water 64.00%. The dilution water was added to the base mud with the sample to be tested. In each case, the muds thickened upon addition of the heavy metal salt, but subsequent addition of caustic soda to bring the pH within the preferred range restored the fluidity of the system. Each sample was stirred for 30 minutes on a high speed mixer, allowed to stand overnight, again stirred for 30 minutes and then tested for viscosity, gel strengths, water loss and pH according to the procedures outlined in A. P. I code #29. The results are shown in the following table:

*Effect of metal CMC precipitates on EB-10-F*

[Dosage=0.59 lbs./bbl.]

| Additive | None | HgCMC | PbCMC | FeCMC |
|---|---|---|---|---|
| Viscosity | 17.5 | 14 | 10.5 | 28 |
| Initial Gel | 30 | 2 | .5 | 5 |
| 10' Gel | 50 | 15 | 30 | 80 |
| 30' W. L. | 29 | 19 | 21.5 | 13 |
| pH | 9.0 | 8.3 | 7.9 | 10.7 |

EXAMPLE C

A possible mechanism whereby the insoluble heavy metal carboxymethylcelluloses are solubilized is indicated by the following described tests made with iron carboxymethylcellulose. It was found that adding alkali (NaOH) to a water suspension of the insoluble iron carboxymethylcellulose gave a clear solution. In other words, ferric hydroxide did not appear to be formed as might be expected if iron carboxymethylcellulose was converted into sodium carboxymethylcellulose. It is unlikely that ferric hydroxide was formed and was prevented from precipitating by the carboxymethylcellulose solution since this is not indicated by the clearness of the solution. It would appear that the iron carboxymethylcellulose itself was solubilized. To explain this, it is necessary to assume that the initial insoluble iron formed had a complex formula such as $Fe(NO_3)_2$-carboxymethylcellulose and the alkali soluble form is $Fe(OH)_2$-carboxymethylcellulose or $Fe(ONa)_2$-carboxymethylcellulose. Such a situation could exist for the other insoluble metal carboxymethylcelluloses.

The above simple experiments are merely representative and are given to show how heavy metal carboxymethylcellulose may be used in water base drilling muds by those skilled in the art of water base drilling muds.

It is to be understood that while a theory of operation has been advanced, it is not the only or necessary one, but has only been advanced to facilitate the disclosure. It is understood, however, that this invention is not limited to any theory of operation or action. It is further obvious that various changes may be made in the details without departing from the spirit of this invention, nor from the scope of the invention as defined in the following claims. It is to be understood the invention is not to be limited to the specific details described. All of the treating and control agents of the well drilling fluid and well controlling fluid arts may, after a simple test for solubility and lack of obvious adverse reaction, be employed without invention in my heavy metal carboxymethylcellulose drilling and controlling fluids, and with few exceptions, they will be so employable. My invention is therefore to be defined by the following claims.

I claim:

1. A water base well drilling mud comprising in combination sufficient water to maintain the mud as a fluid, sufficient alkali to maintain a pH of 7.9 or greater, sufficient clayey material to form a filter cake on the wall of the well, and a salt of carboxymethylcellulose and a metal selected from the group composed of the metals of groups IB, IIB, IV, V, VI, VII and VIII of the periodic series of elements in an amount sufficient to reduce the water loss due to filtration through said filter cake without increasing the viscosity of said well drilling mud to such an extent that it cannot be circulated.

2. A water base well drilling mud comprising in combination sufficient water to maintain the mud as a fluid, sufficient alkali to maintain a pH of 7.9 or greater, sufficient clayey material to form a filter cake on the wall of the well, and an iron carboxymethylcellulose in an amount sufficient to reduce the water loss due to filtration through said filter cake without increasing the viscosity of said well drilling mud to such an extent that it cannot be circulated.

3. A water base well drilling mud comprising in combination sufficient water to maintain the mud as a fluid, sufficient alkali to maintain a pH of 7.9 or greater, sufficient clayey material to form a filter cake on the wall of the well, and a lead carboxymethylcellulose in an amount sufficient to reduce the water loss due to filtration through said filter cake without increasing the viscosity of said well drilling mud to such an extent that it cannot be circulated.

4. A water base well drilling mud comprising in combination sufficient water to maintain the mud as a fluid, sufficient alkali to maintain a pH of 7.9 or greater, sufficient clayey material to form a filter cake on the wall of the well, and a zinc carboxymethylcellulose in an amount sufficient to reduce the water loss due to filtration through said filter cake without increasing the viscosity of said well drilling mud to such an extent that it cannot be circulated.

5. A water base well drilling mud comprising an aqueous fluid mixture containing suspended solids which form a filter cake on the wall of the well, sufficient alkali to maintain a pH of 7.9 or greater, and a salt of carboxymethylcellulose and a metal selected from the group composed of the metals of groups IB, IIB, IV, V, VI, VII and VIII of the periodic series of elements in an amount sufficient to reduce the water loss due to filtration through said filter cake without increasing the viscosity of said well drilling mud to such an extent that it cannot be circulated.

6. A water base well drilling mud comprising an aqueous fluid mixture containing suspended solids which form a filter cake on the wall of the well, sufficient alkali to maintain a pH of 7.9 or greater, and an iron carboxymethylcellulose in an amount sufficient to reduce the water loss due to filtration through said filter cake without increasing the viscosity of said well drilling mud to such an extent that it cannot be circulated.

7. A water base well drilling mud comprising an aqueous fluid mixture containing suspended solids which form a filter cake on the wall of the well, sufficient alkali to maintain a pH of 7.9 or greater, and a lead carboxymethylcellulose in an amount sufficient to reduce the water loss due to filtration through said filter cake without increasing the viscosity of said well drilling mud to such an extent that it cannot be circulated.

8. A water base well drilling mud comprising an aqueous fluid mixture containing suspended solids which form a filter cake on the wall of the well, sufficient alkali to maintain a pH of 7.9 or greater, and a zinc carboxymethylcellulose in an amount sufficient to reduce the water loss due to filtration through said filter cake without increasing the viscosity of said well drilling mud to such an extent that it cannot be circulated.

9. A process for forming a filter cake, having a low rate of filtration of fluid therethrough, on the wall of a well by deposition of colloidal clayey solids from a water base drilling mud, having a pH of at least 7.9, circulated along said well wall which comprises admixing with said drilling mud and interacting therewith a salt of a carboxymethylcellulose and a metal selected from the group consisting of the metals of groups IB, IIB, IV, V, VI, VII and VIII of the periodic series, in an amount sufficient to decrease the rate of filtration of fluid through said filter cake but insufficient to increase the viscosity of said drilling mud to such an extent as to render it uncirculatable and then forming said filter cake from the resulting drilling mud.

10. The process of claim 9 wherein the carboxymethylcellulose salt is iron carboxymethylcellulose.

11. The process of claim 9 wherein the carboxymethylcellulose salt is lead carboxymethylcellulose.

12. The process of claim 9 wherein the carboxymethylcellulose salt is zinc carboxymethylcellulose.

13. The process of claim 9 wherein the corboxymethylcellulose salt is mercury carboxymethylcellulose.

14. The process of claim 9 wherein the carboxymethylcellulose salt is copper carboxymethylcellulose.

15. A process for forming a filter cake, having a low rate of filtration of fluid therethrough, on the wall of a well by deposition of suspended solids from a water base drilling mud, having a pH of at least 7.9, circulated along said wall which comprises admixing with said drilling mud and interacting therewith a salt of a carboxymethylcellulose and a metal selected from the group consisting of the metals of groups IB, IIB, IV, V, VI, VII and VIII of the periodic series, in an amount sufficient to decrease the rate of filtration of fluid through said filter cake but insufficient to increase the viscosity of said drilling mud to such an extent as to render it uncirculatable and then forming said filter cake from the resulting drilling mud.

16. The process of claim 15 wherein the carboxymethylcellulose salt is iron carboxymethylcellulose.

17. The process of claim 15 wherein the carboxymethylcellulose salt is lead carboxymethylcellulose.

18. The process of claim 15 wherein the carboxymethylcellulose salt is zinc carboxymethylcellulose.

19. The process of claim 15 wherein the carboxymethylcellulose salt is mercury carboxymethylcellulose.

20. The process of claim 15 wherein the carboxymethylcellulose salt is copper carboxymethylcellulose.

21. A water base well drilling mud comprising in combination sufficient water to maintain the mud as a fluid, sufficient alkali to maintain a pH of 7.9 or greater, sufficient clayey material to form a filter cake on the wall of the well, and a mercury carboxymethylcellulose in an amount sufficient to reduce the water loss due to filtration through said filter cake without increasing the viscosity of said well drilling mud to such an extent that it cannot be circulated.

22. A water base well drilling mud comprising in combination sufficient water to maintain the mud as a fluid, sufficient alkali to maintain a pH of 7.9 or greater, sufficient clayey material to form a filter cake on the wall of the well, and a copper carboxymethylcellulose in an amount sufficient to reduce the water loss due to filtration through said filter cake without increasing the viscosity of said well drilling mud to such an extent that it cannot be circulated.

VIRGIL SCARTH.

REFERENCES CITED

The following references are of record in the file of this patent:

UNITED STATES PATENTS

| Number | Name | Date |
|---|---|---|
| 2,129,913 | Cross et al. | Sept. 13, 1938 |
| 2,425,768 | Wagner | Aug. 19, 1947 |